May 6, 1924.
E. S. G. REES
AEROPLANE AND OTHER AIRCRAFT
Filed Jan. 27, 1920     4 Sheets-Sheet 1
1,493,280
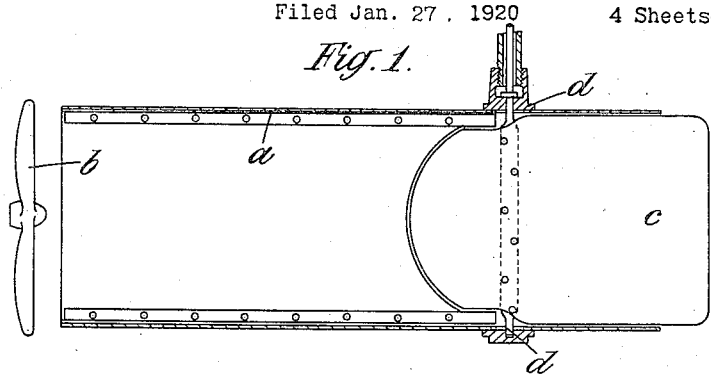
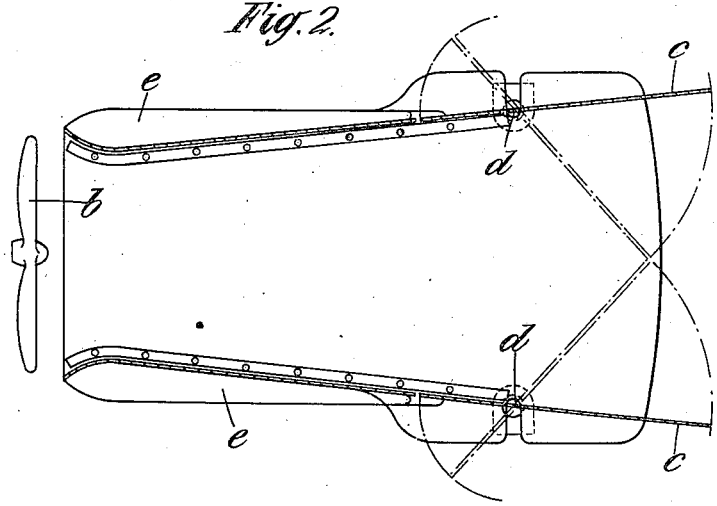
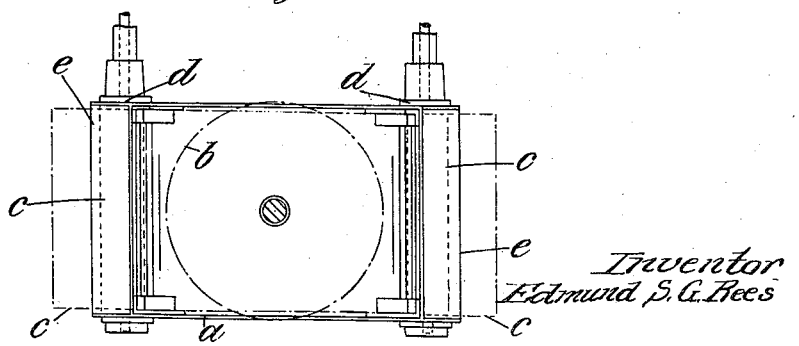
Inventor
Edmund S. G. Rees May 6, 1924.  1,493,280
E. S. G. REES
AEROPLANE AND OTHER AIRCRAFT
Filed Jan. 27, 1920  4 Sheets-Sheet 2
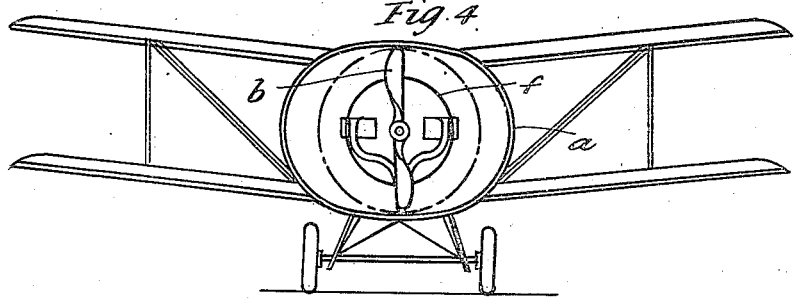
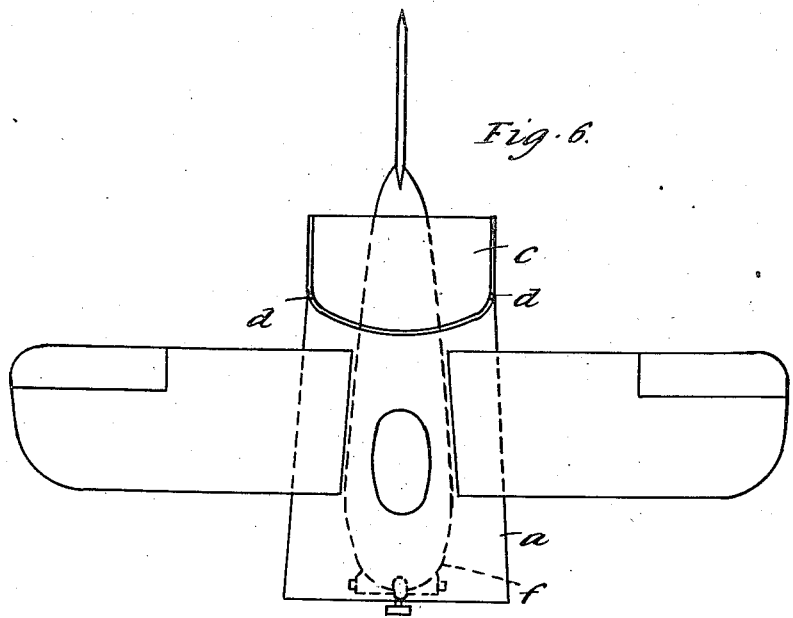
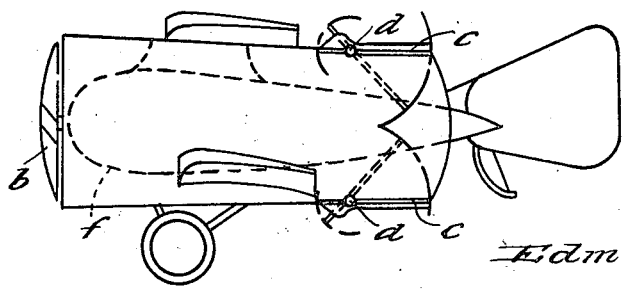
Inventor
Edmund S. G. Rees

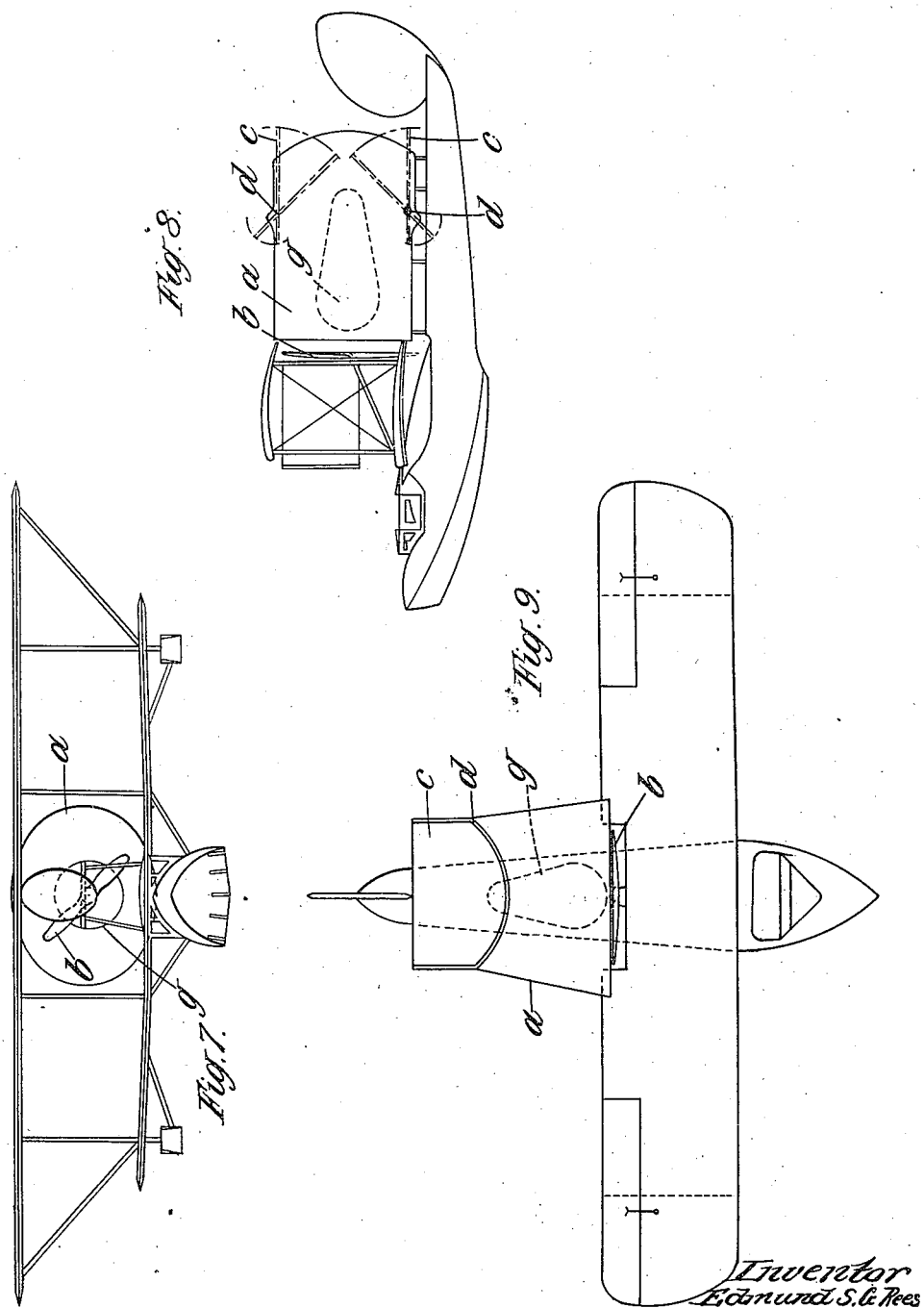

May 6, 1924.
E. S. G. REES
AEROPLANE AND OTHER AIRCRAFT
Filed Jan. 27, 1920    4 Sheets-Sheet 4
1,493,280
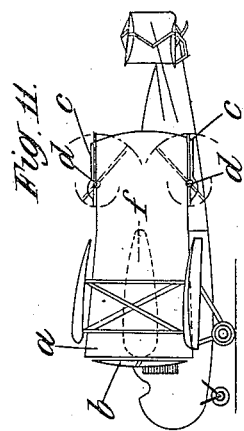
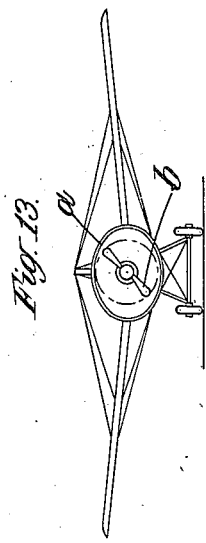
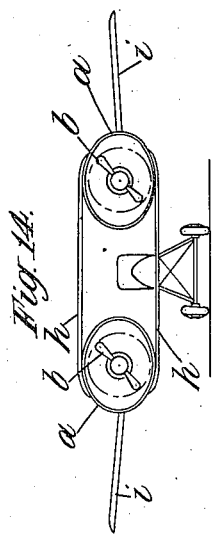
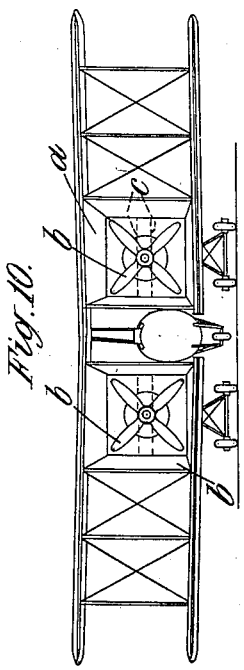
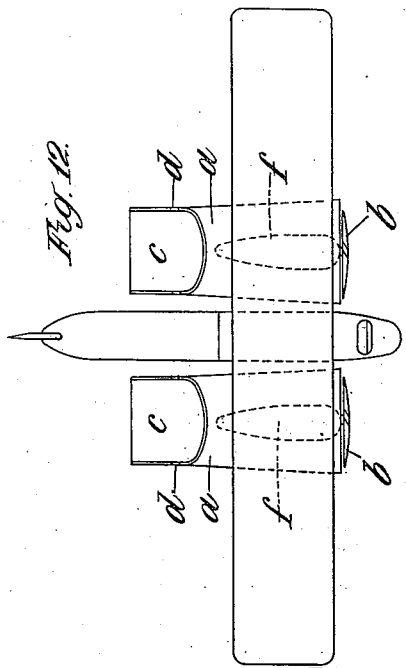
Inventor
Edmund S. G. Rees
By James L. Norris
Attorney Patented May 6, 1924.

1,493,280

UNITED STATES PATENT OFFICE.

EDMUND SCOTT GUSTAVE REES, OF WOLVERHAMPTON, ENGLAND.

AEROPLANE AND OTHER AIRCRAFT.

Application filed January 27, 1920. Serial No. 354,523.

*To all whom it may concern:*

Be it known that I, EDMUND SCOTT GUSTAVE REES, a subject of the King of Great Britain, residing in Wolverhampton, England, have invented certain new and useful Improvements in Aeroplanes and Other Aircraft, of which the following is a specification.

This invention has several objects which are sought to be attained by one and the same apparatus, or by a plurality of such apparatus which may be severally modified according to the particular functions which they subserve.

The principal objects are to recover as much as possible of the energy lost in the "slip" stream set up by the driving propellers of air-craft and other vessels propelled by air propellers, and to obtain greater facility of manœuvring, and in particular in the case of aeroplanes of landing.

The apparatus employed comprises a longitudinal open-ended duct or air trunk surrounding or immediately in rear of the air propeller (or in the case of twin or multiple screw craft, surrounding or immediately in rear of each air propeller) and the essential feature of such air trunks according to the present invention is that they should have a rearwardly expanding portion of such dimensions and taper as to obtain minimum loss through "slip" by utilizing the kinetic energy of the slip stream to maintain a reduced pressure in rear of the propeller or propellers. The air trunk may flare both forwardly and rearwardly from an intermediate point of its length or it may flare rearwardly only.

For manœuvring purposes there is associated with each air trunk a movable pallet or a pair of such pallets adapted to close the rear end of the air trunk partially or completely and thereby control within wide limits the pressure conditions within the air trunk in rear of the propeller as well as the direction and velocity of the streams of air within the trunk and at the point or points of issue therefrom, but such pallets are herein claimed broadly only in conjunction with expanding air trunks as hereinbefore set forth. The pallets which in the case of aeroplanes particularly are usually movable upon normally horizontal pivots but may, for other than landing purposes, be pivoted on axes other than normally horizontal, are arranged to be movable separately or simultaneously in the same sense or in opposite senses and may function in certain circumstances simply as ailerons or brakes.

In the accompanying drawings Fig. 1 is a vertical longitudinal section; Fig. 2 a horizontal longitudinal section and Fig. 3 a transverse section of an air trunk with its controlling pallets or ailerons in accordance with the present invention, shewn in its usual relation with a propeller; Figs. 4, 5 and 6 are respectively a front elevation, side elevation and plan view illustrating the application of the invention to a tractor biplane; Figs. 7, 8 and 9 are similar views illustrating the application of the invention to a flying boat; Figs 10, 11 and 12 are similar views illustrating the application of the invention to a twin screw tractor biplane; Fig. 13 is a front elevation illustrating the application of the invention to a single screw tractor monoplane; and Fig. 14 is a similar view showing the application of the invention to a twin screw modification of the same kind of machine.

Referring first to Figs. 1 to 3 the air trunk $a$ is shown therein as flaring both ways from an intermediate point, namely forwardly towards the propeller $b$ and rearwardly towards the pallets or ailerons $c$. The latter are mounted to turn on normally horizontal or approximately horizontal pivots $d$ and are formed to constitute in their open position (shown in full lines in Fig. 2) the end part of the top and bottom walls of the air trunk $a$. These pallets are movable independently or simultaneously about their pivots by means of any apparatus suitable for this purpose operated or controlled by the pilot.

By means of these pallets the pressure conditions within the air trunk in rear of the propeller may be controlled within wide limits, as well as the direction and velocity of the air in the air trunk. For example, the opening between the rearward edges of the pallets may be so adjusted that with the engine and propeller running the propelling force of the latter may be completely annulled or reduced to any desired extent. In the case of airships or aeroplanes on the ground or surface water vessels driven by air propellers the further closure of the rearward edges of the pallets would cause the vessel to go astern with the propeller or propellers running for forward driving.

At the moment of alighting a slight upward movement of the rear ends of either or both pallets c would serve to hold the tail of the aeroplane hard down against the ground by the resultant pressure of the issuing streams of air on their surfaces, and the closure or substantial closure of the rear end of the air trunk by means of the pallets and the consequent forward deflection of the air current would quickly bring the machine to a standstill. It would thus be possible to effect a controlled landing under practically any wind conditions and with the engine and propeller running.

As shown in Fig. 1 the outer hollow surface of the air trunk a is filled in by means of a suitably shaped structure e to reduce the air resistance of the trunk, the outer contour being given an approximately stream-line form.

In Figs. 4, 5 and 6 the air trunk is constituted by a tube a of substantially oblate, elliptical or oval section which embraces the streamline body f enclosing the engines etc. of the aeroplane, and the dimensions of the air trunk are so arranged as—in conjunction with this streamline body—to give a successively decreasing and increasing cross section to the space between the air trunk and the body f.

As in the construction of Figs. 1–3 the pallets c, which are shown in full lines in the open or full-speed ahead position and in dotted lines in a partially closed position designed to reduce the propelling force to a minimum, are arranged to form the end portions of the top and bottom surfaces of the air trunk.

As applied to aircraft with the propeller or propellers astern of the engine, as shown for example in the flying boat illustrated in Figs. 7, 8 and 9, the air trunk a may itself be shaped to give any desired successive decrease and increase of cross sectional area, or the same result may be obtained, as shown more particularly in Fig. 8, by the introduction within an air trunk a of substantially uniform section from front to rear, of a structure g having a streamline surface and the dimensions necessary to give the required expansion of the air passage within the trunk. There is an initial contraction of the air passage but this could be annulled if the advantage of the streamline shape of the structure g be abandoned.

Obviously the invention is equally applicable to a vessel not designed to rise off the surface of the water which is driven by one or more air propellers whether such propeller is in rear of or in front of the engine.

In Figs. 10, 11 and 12 each of the propellers b has a separate air trunk a the walls of which are flared and of such dimensions that in conjunction with the streamline bodies f enclosing the engines and other accessories the desired expansion of the air passage is obtained.

In the monoplane illustrated in Fig. 13 the air trunk is shown as being of oval cross section, but it will be understood that the precise shape of the air trunk is not of the essence of the invention but will be determined partly by the character and configuration of the aeroplane or the like to which it is applied.

In the twin screw aeroplane shown in Fig. 14 the air trunks a associated with each propeller b are connected above and below by supporting surfaces or plane h preferably formed so as, in conjunction with the outer lateral surfaces of the air trunks, to present a streamline formation laterally and thereby minimize sidewise resistance, and this structure may be supplemented, as shown, by the provision on each side of a laterally projecting supporting plane i.

It will be understood that for other manœuvring purposes the axis of the pallets may be in planes other than normally horizontal planes. Also, the pallets controlling the issue of air from the air trunk may each be subdivided into two or more sections coupled together for simultaneous movement.

Having thus described the nature of the said invention and the best means I know of carrying the same into practical effect, I claim:—

1. In aircraft and other vessels driven by air propellers, the combination with a propeller of an open-ended air duct having a rearwardly expanding or flaring portion in rear of the propeller and a pair of pallets controlling the rear opening of the air duct and forming part of the wall of the duct in the normal or full-speed ahead position.

2. In aircraft and other vessels driven by air propellers, the combination with a propeller of an open-ended air duct having a rearwardly expanding or flaring portion in rear of the propeller, and means for controlling the direction of flow of the streams of air within and from the air duct comprising a pair of pivoted pallets or vanes adapted to be turned about their pivots simultaneously and independently in the same sense and in opposite senses.

3. In aircraft and other vessels driven by air propellers, the combination with a propeller of an open-ended air duct in rear of the propeller, a pair of pallets horizontally pivoted near the rear end of the duct, and means whereby the pallets can be turned about their pivots simultaneously in the same sense and in opposite senses to control the flow of air within and from the duct.

4. In aircraft and other vessels driven by air propellers, the combination with a propeller of an open-ended air duct in rear of the propeller, a pair of pallets horizontally pivoted near the rear end of the duct, and means whereby the pallets can be turned about their pivots independently in the same sense and in opposite senses to control the flow of air within and from the duct.

5. In aircraft and other vessels driven by air propellers, the combination with a propeller of an open-ended air duct in rear of the propeller, a pair of pallets horizontally pivoted near the rear end of the duct, and means whereby the pallets can be turned about their pivots simultaneously and independently in the same sense and in opposite senses to control the flow of air within and from the duct.

6. In aircraft and other vessels driven by air propellers, the combination with a propeller of an open-ended air duct and a stream-line body or core in rear of the propeller partly filling the interior of the duct and dimensioned to provide a rearwardly expanding passage within the duct.

In testimony whereof I have signed my name to this specification.

EDMUND SCOTT GUSTAVE REES.